(12) United States Patent
Rolland

(10) Patent No.: US 9,783,004 B2
(45) Date of Patent: Oct. 10, 2017

(54) LAYERED TIRE TREAD DESIGN WITH BRIDGED CIRCUMFERENTIAL AND TRANSVERSE GROOVES

(71) Applicants: COMPAGNIE GENERALE DES ETABLISSEMENTS MICHELIN, Clermont-Ferrand (FR); MICHELIN RECHERCHE et TECHNIQUE S.A., Granges-Paccot (CH)

(72) Inventor: Maxime Rolland, Greer, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 844 days.

(21) Appl. No.: 13/873,883

(22) Filed: Apr. 30, 2013

(65) Prior Publication Data

US 2013/0284334 A1    Oct. 31, 2013

Related U.S. Application Data

(60) Provisional application No. 61/640,370, filed on Apr. 30, 2012.

(51) Int. Cl.
| | |
|---|---|
| *B60C 11/13* | (2006.01) |
| *B60C 11/03* | (2006.01) |
| *B60C 11/12* | (2006.01) |

(52) U.S. Cl.
CPC .......... *B60C 11/03* (2013.01); *B60C 11/0306* (2013.01); *B60C 11/0309* (2013.01); *B60C 11/0323* (2013.01); *B60C 11/125* (2013.01); *B60C 11/1353* (2013.01);
(Continued)

(58) Field of Classification Search
CPC ............ B60C 11/0323; B60C 11/1281; B60C 11/0306; B60C 11/0309; B60C 11/03; B60C 11/125; B60C 2011/0355; B60C 2011/0369; B60C 11/13; B60C 11/1353
See application file for complete search history.

(56) References Cited

U.S. PATENT DOCUMENTS

| | | | | |
|---|---|---|---|---|
| 3,698,462 A | * | 10/1972 | Jacobs ................ | B60C 11/0309 152/209.18 |
| 4,711,283 A | * | 12/1987 | Bonko ................ | B60C 11/0311 152/209.12 |
| 6,443,200 B1 | | 9/2002 | Lopez | |

(Continued)

FOREIGN PATENT DOCUMENTS

| | | | | |
|---|---|---|---|---|
| JP | 01095913 A | * | 4/1989 | ............ B60C 11/12 |
| JP | H0234406 A | | 2/1990 | |

(Continued)

*Primary Examiner* — Michael H Wilson
*Assistant Examiner* — Philip N Schwartz
(74) *Attorney, Agent, or Firm* — Dority & Manning, P.A.

(57) ABSTRACT

A tire tread is provided having a layered design that includes bridged and unbridged circumferential grooves during earlier stages of tread life while transverse and unbridged circumferential grooves are provided at later stages of tread life. Together, the combination of grooves can provide desired wet adherence performance without unacceptable compromises of tread wear and/or rolling resistance. Pockets can also be provided at the end of the transverse grooves to increase the volume available for receipt of water during wet traction.

19 Claims, 8 Drawing Sheets

(52) U.S. Cl.
CPC ... *B60C 11/1281* (2013.01); *B60C 2011/0355* (2013.01); *B60C 2011/0369* (2013.01); *Y02T 10/862* (2013.01)

(56) References Cited

U.S. PATENT DOCUMENTS

| | | |
|---|---|---|
| 6,910,381 B2 | 6/2005 | Albert et al. |
| 8,191,591 B2 | 6/2012 | Shimizu |
| 8,511,356 B2 | 8/2013 | Ohashi |
| 2007/0144641 A1 | 6/2007 | Nguyen et al. |
| 2007/0151646 A1* | 7/2007 | Ito ................ B60C 11/0306 152/209.25 |
| 2010/0059156 A1* | 3/2010 | Cambron ............ B60C 11/00 152/209.5 |
| 2010/0175799 A1 | 7/2010 | Takahashi et al. |
| 2011/0017374 A1 | 1/2011 | Bervas et al. |
| 2011/0125465 A1* | 5/2011 | Buresh ............ B60C 11/0311 703/1 |
| 2011/0168311 A1 | 7/2011 | Voss et al. |
| 2011/0259487 A1 | 10/2011 | Montbel et al. |
| 2011/0277898 A1 | 11/2011 | Barraud et al. |
| 2012/0080130 A1 | 4/2012 | Scheuren |
| 2013/0061993 A1* | 3/2013 | Mathonet ............ B60C 11/042 152/209.22 |

FOREIGN PATENT DOCUMENTS

| | | |
|---|---|---|
| JP | 2001277815 | 10/2001 |
| JP | 2009001206 | 1/2009 |
| WO | WO 2010/030276 | 3/2010 |

\* cited by examiner

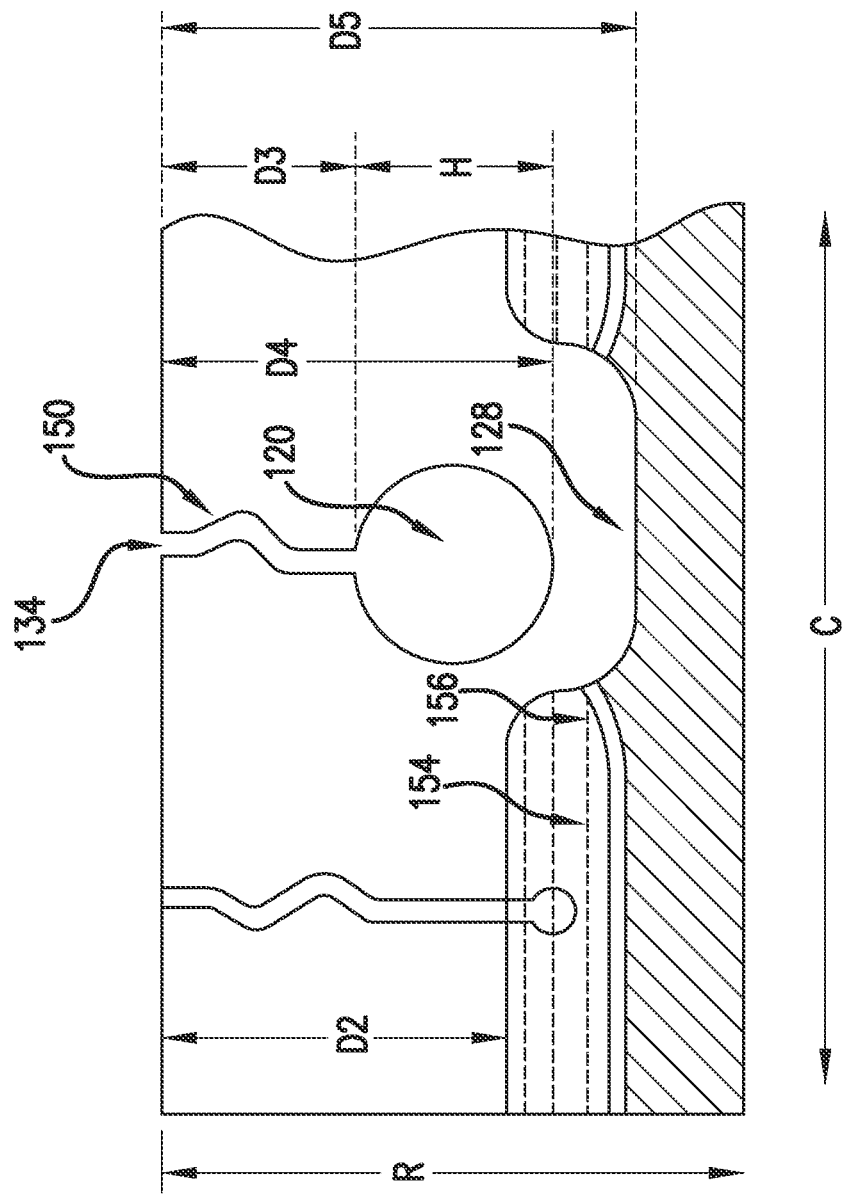

LAYERED TIRE TREAD DESIGN WITH BRIDGED CIRCUMFERENTIAL AND TRANSVERSE GROOVES

PRIORITY CLAIM

This application claims priority to U.S. Provisional Patent Application No. 61/640,370 filed on Apr. 30, 2012. The foregoing provisional patent application is incorporated herein by reference for all purposes.

FIELD OF THE INVENTION

The subject matter of the present disclosure generally relates to a layered tread design for a tire and, more specifically, to such a tread that provides a better combination of rolling resistance, tread wear and wet traction.

BACKGROUND OF THE INVENTION

In general, the design and manufacture of a tire includes consideration of multiple factors such as e.g., tread wear, rolling resistance, traction, noise generation, and numerous others as well. Problems are encountered in attempting to optimize such factors because, conventionally, improvement of one factor may have a deleterious impact on one or more other factors. As such, typically a balance or compromise is selected.

For example, one common problem confronted in tire design and manufacture is how to lower the rolling resistance of the tire without compromising the wear life of the tread or its wet adherence performance. More specifically, in general the addition of circumferentially-oriented grooves provides volume for the receipt of water that can improve wet traction but can also have a negative impact on rolling resistance and/or tread wear because e.g., it reduces the rigidity of the tread and the effective volume of rubber of the tread. Conversely, the removal of such circumferentially-oriented grooves can increase rigidity to improve rolling resistance and/or tread wear but can also have a correspondingly negative impact on wet traction.

Prior approaches to this problem have included layering the tread design such that an additional circumferentially-oriented groove appears only after a certain amount of tread wear has occurred. For example, see U.S. Patent Application Publication No. 2011168311A to Voss et al. and U.S. Patent Application Publication No. 2010072523, which are commonly owned by the assignee(s) of the present application. These references, for example, provide that at the early stages of tread life, a circumferentially-oriented groove may be hidden and located between other circumferentially-oriented grooves that are not hidden. As the tread wears, the hidden circumferentially-oriented groove is uncovered with the removal of tread rubber and provides for assistance in wet traction. This design approach can also improve rolling resistance and wear life of the tread. However, for large tread widths especially, the distance between circumferentially-oriented grooves can affect wet traction. For example, increasing the distance between circumferentially-oriented grooves by providing a hidden circumferentially-oriented groove therebetween can lower the ability to uniformly dry the tire contact patch during use. This effect can become even more pronounced at higher speeds. Accordingly, in view of the problems in the art including those set forth above, there is a need for a tire tread that can have improved rolling resistance and/or improved tread wear life potential without compromising wet traction performance.

SUMMARY OF THE INVENTION

The present invention provides a tire tread having a layered design that provides bridged and unbridged circumferential grooves during earlier stages of tread life while transverse and unbridged circumferential grooves are provided at later stages of tread life. Together, this combination of grooves can provide the desired wet traction performance without unacceptable compromises of tread wear and/or rolling resistance. Pockets can also be provided at the end of the transverse grooves to increase the volume available for receipt of water during wet traction. Additional aspects and advantages of the invention will be set forth in part in the following description, or may be apparent from the description, or may be learned through practice of the invention.

For example, in one exemplary embodiment, the present invention provides a tire tread having transverse, radial, and circumferential directions and a contact surface. The tire tread includes an unbridged circumferential groove extending along the circumferential direction and having a depth D1 along the radial direction. A bridged circumferential groove extends along the circumferential direction and has a depth D2 along the radial direction. A transverse groove extends along the transverse direction and has a height along the radial direction that extends from a top depth D3 to a bottom depth D4 so that the transverse groove is hidden during early stages of wear life of the tire tread.

In another exemplary embodiment, the present invention provides a tire tread having transverse, radial, and circumferential directions and a contact surface. The tire tread includes an unbridged circumferential groove extending along the circumferential direction and having a depth D1 along the radial direction. A bridged circumferential groove extends along the circumferential direction and has a depth D2 along the radial direction. A transverse groove extends along the transverse direction and has a height along the radial direction that extends from a top depth D3 to a bottom depth D4 so that the transverse groove is covered by a portion of the tire tread during earlier stages of tread wear life. The transverse groove has at least one end. A pocket is positioned in the bridged circumferential groove at the end of the transverse groove. The pocket has a depth D5 that is greater than depth D4 of the transverse groove.

In still another exemplary embodiment, the present invention is a tire having transverse, radial, and circumferential directions. The tire includes a plurality of unbridged circumferential grooves extending along the circumferential direction and having a depth D1 along the radial direction. A plurality of bridged circumferential grooves extend along the circumferential direction and have a depth D2 along the radial direction. A plurality of transverse grooves extend along the transverse direction with at least one of the transverse grooves positioned between one of the bridged circumferential grooves and one of the unbridged circumferential grooves. Each transverse groove has a height along the radial direction that extends from a top depth D3 to a bottom depth D4 so that each transverse groove is covered by a portion of the tire tread during earlier stages of tread wear life.

In yet another embodiment, a tire tread having transverse, radial, and circumferential directions and a contact surface is provided, the tire tread includes a bridged circumferential groove extending along the circumferential direction and having a depth D2 from the contact surface along the radial direction. A transverse groove extends along the transverse direction and has a height along the radial direction that extends from a top depth D3 to a bottom depth D4 so that the transverse groove is covered by a portion of the tire tread during earlier stages of tread wear life. The transverse groove has at least one end. The transverse groove has a bottom depth D4 that is more than depth D2 and is in fluid communication with the bridged groove.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 2:
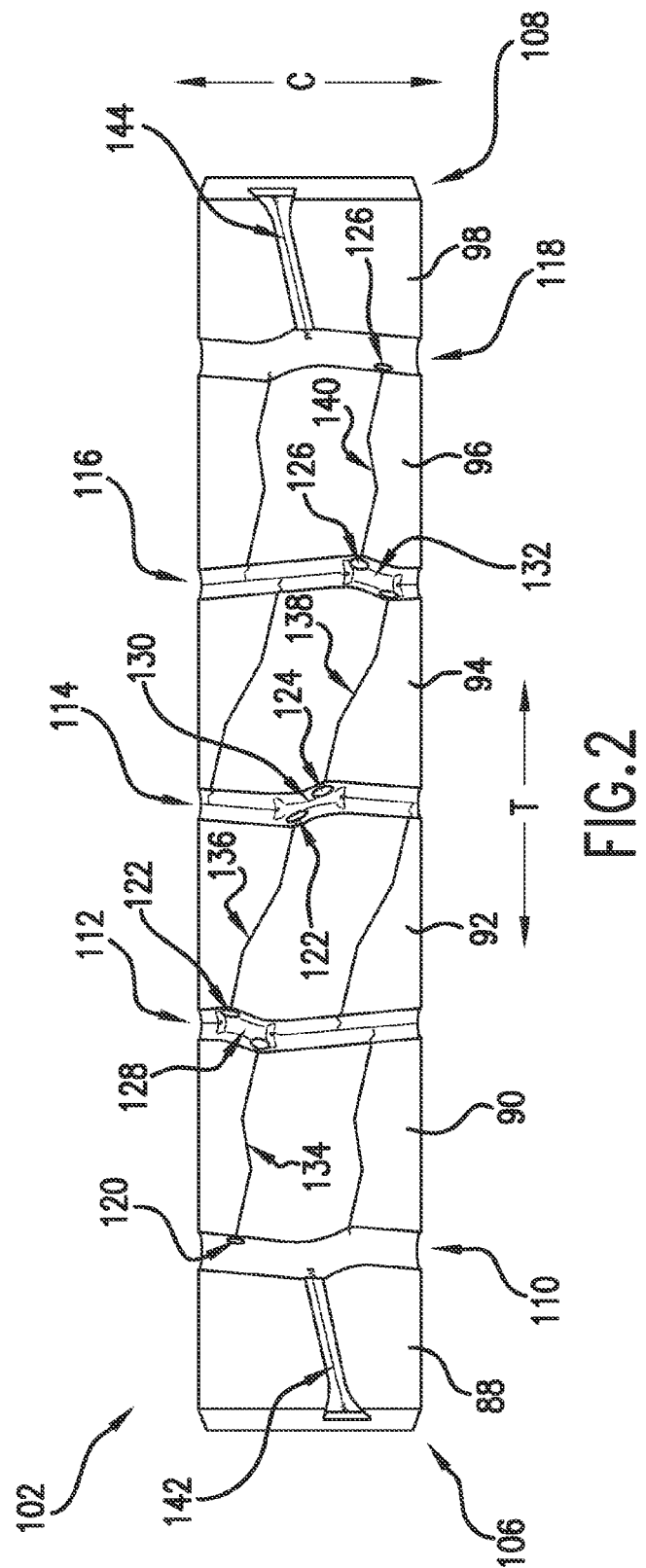
FIG. 2 provides a top view of a portion of an exemplary embodiment of a tread of the present invention in a new or earlier stage of its wear life.
Figure 3:
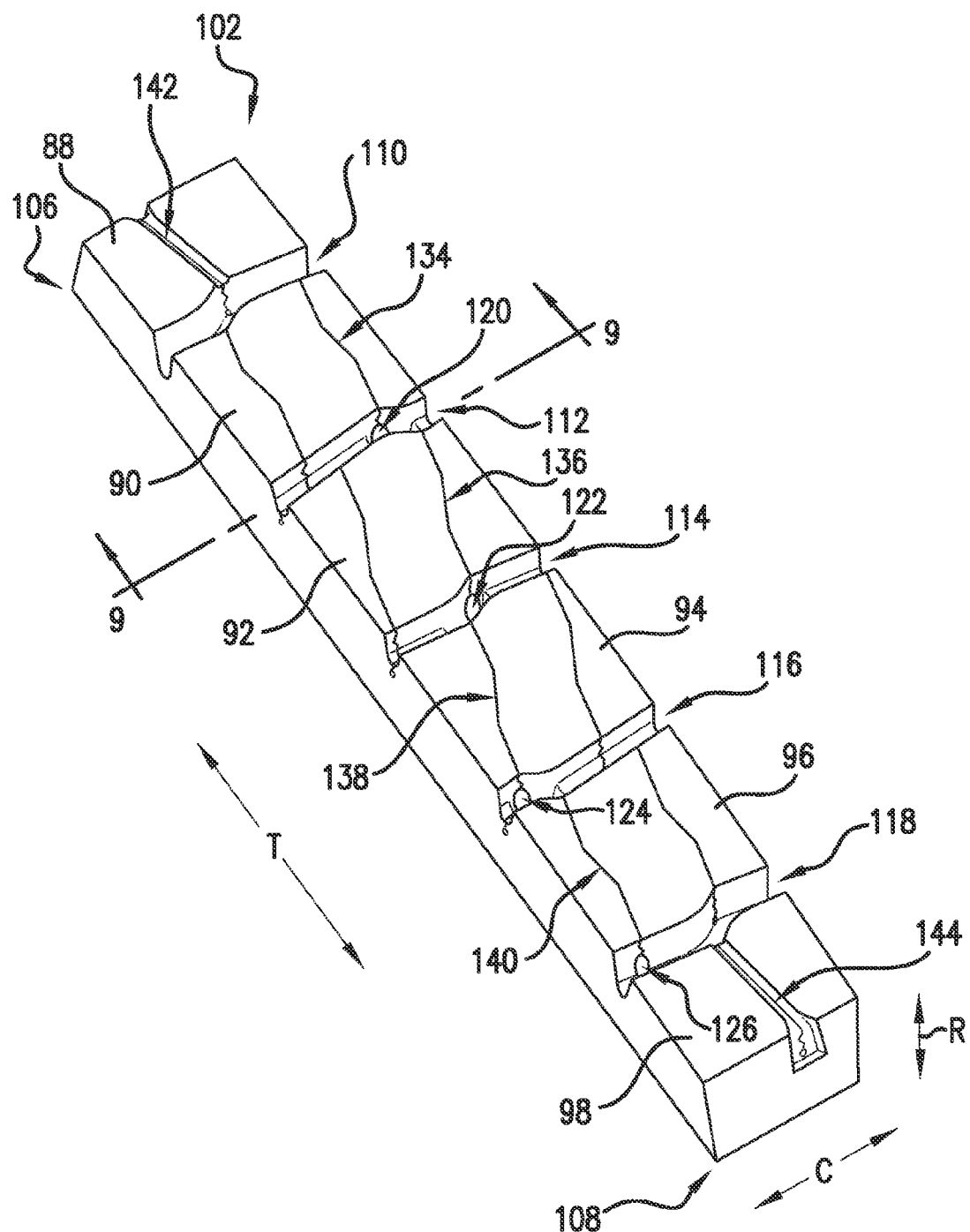

A perspective view of the exemplary tread portion of FIG. 2 is shown in FIG. 3.

Figure 4:
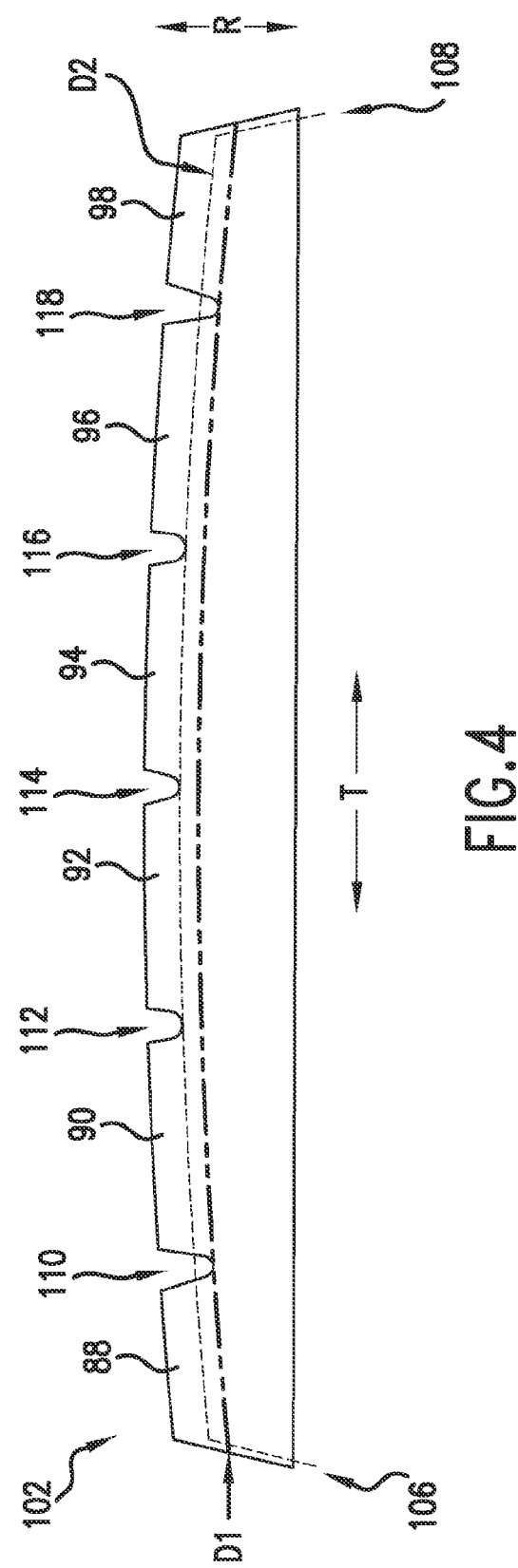

FIG. 4 provides a cross-sectional view of the exemplary tread portion of FIG. 2.

Figure 5:
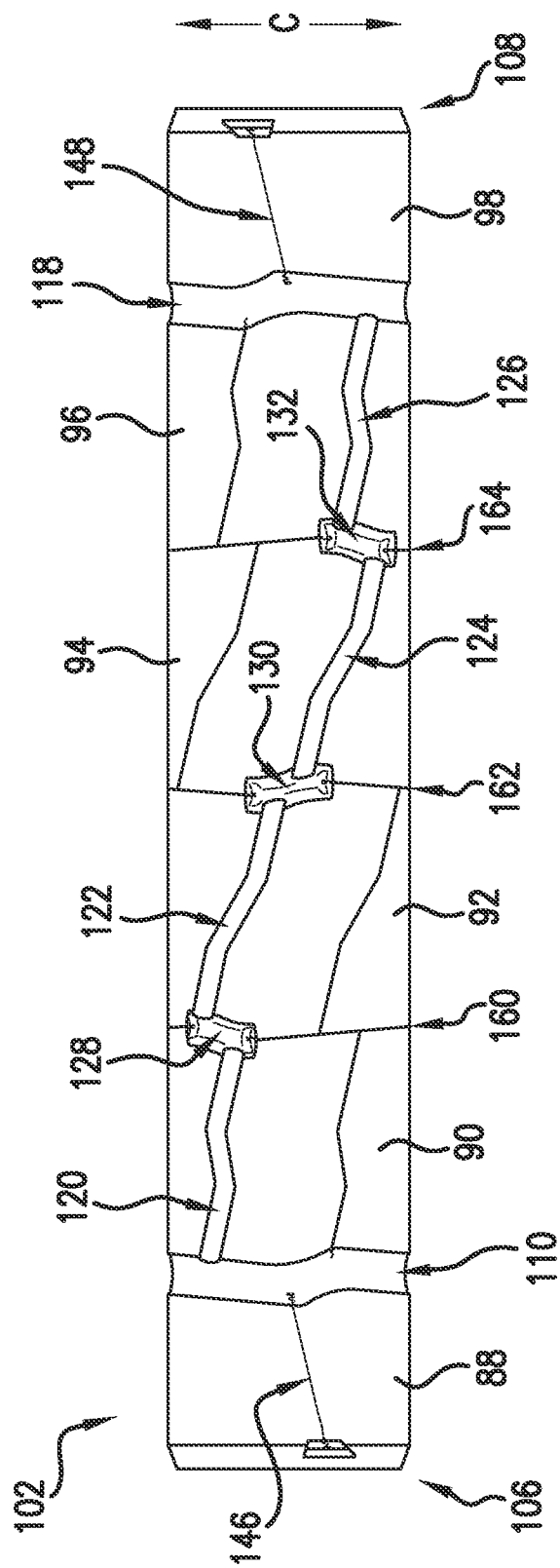

FIG. 5 provides a top view of a portion of the same exemplary embodiment of a tread as shown in FIG. 2—except that in FIG. 5 this exemplary embodiment is in a worn or later stage of its wear life.

Figure 6:
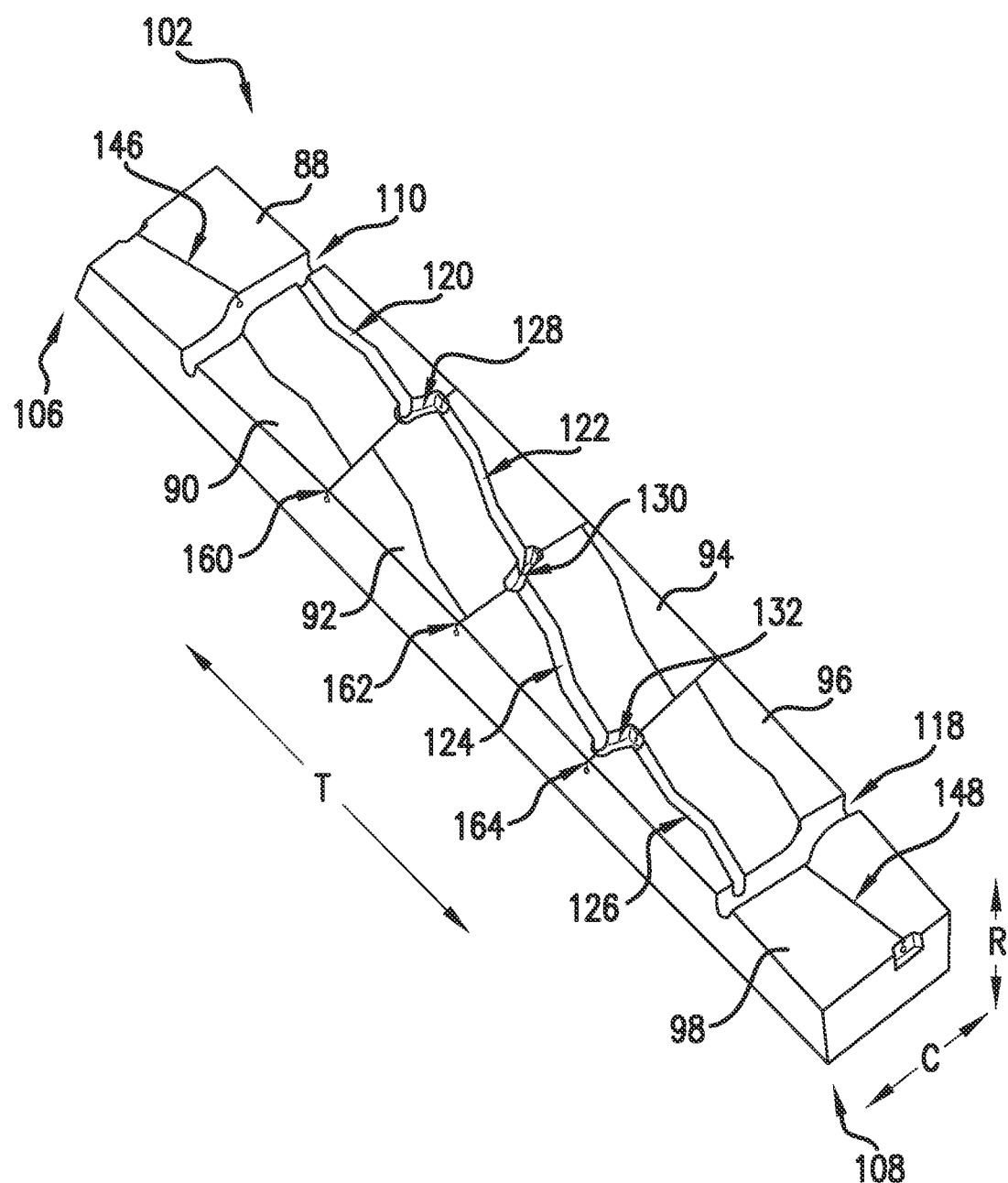

A perspective view of the exemplary tread portion of FIG. 5 is shown in FIG. 6.

Figure 7:
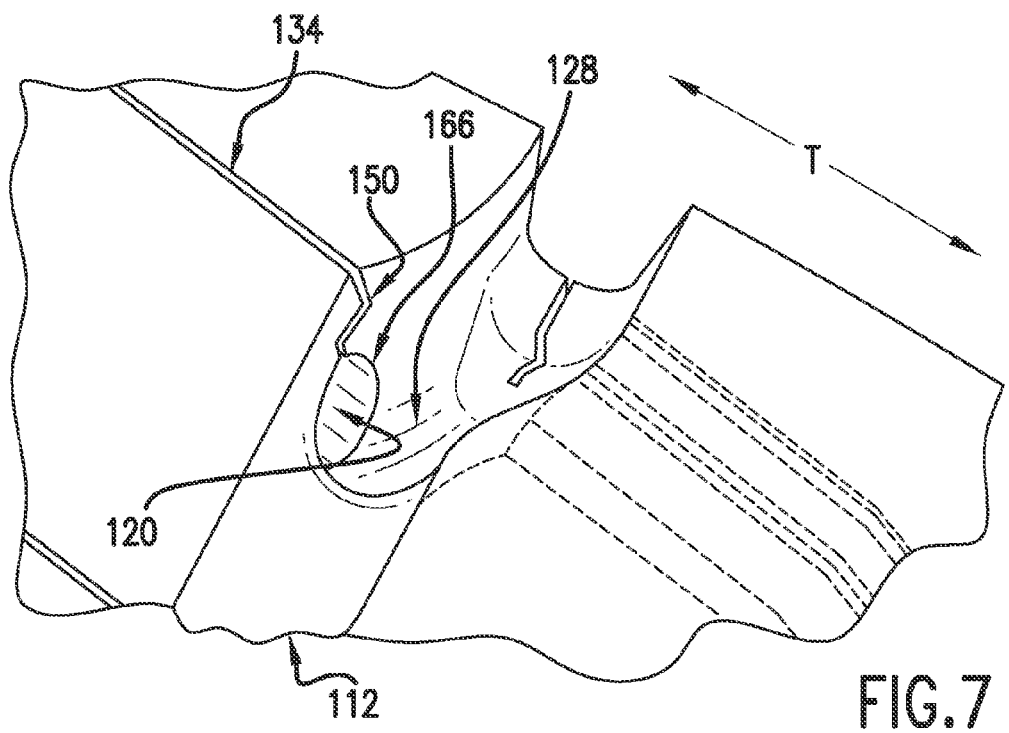

FIG. 7 is a close-up, perspective view of a part of a bridged circumferential groove of the exemplary tread portion shown in FIG. 3.

Figure 8:
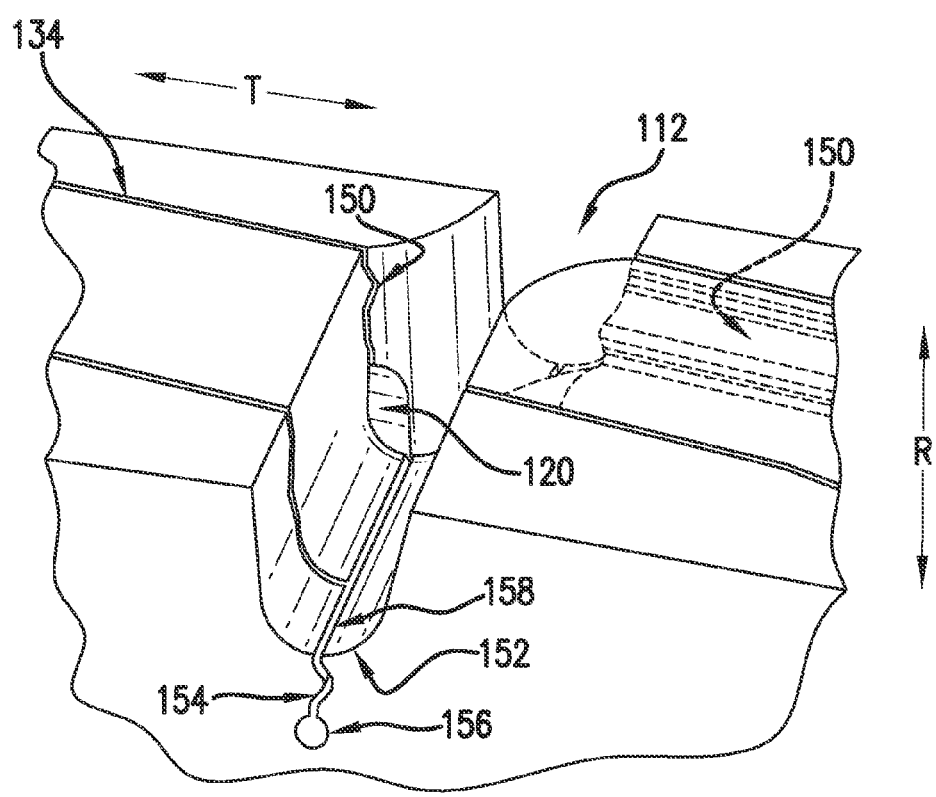

FIG. 8 is an alternate close-up, perspective view of a part of a bridged circumferential groove of the exemplary tread portion shown in FIG. 7 shown at a slightly lower elevation.

FIG. 9 is cross-sectional view of the exemplary tread portion of FIG. 3 as taken along line 9-9 of FIG. 3.

The use of identical or similar reference numerals in different figures denotes identical or similar features.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

The following terms are defined as follows for this disclosure:

"Groove" means a channel-like tread feature having a width of at least about 2 mm.

"Sipe" means a channel-like tread feature having a width of less than about 2 mm. In general, a sipe has an appropriate width so that during rolling there is at least partial contact between the two faces of the sipe when crossing through the contact patch whereas grooves do not usually generate such contact during normal usage conditions.

"Transverse groove" means a groove that extends along the general transverse direction of the tire and does not extend around the tire along the general circumferential direction. That is to say, any groove that extends in a general transverse direction or is within 45 degrees of that direction is considered to be a transverse groove.

"Circumferential groove" means a groove that extends around the tire along the general circumferential direction. In other words, any groove that extends in a general circumferential direction or is within 45 degrees of that direction is considered to be a circumferential groove.

Depth "D" as used herein refers to the depth of a feature along the radial direction as measured from the contact surface of the tread in the new or non-worn state.

"Contact Surface Ratio" or "CSR" is the area of tread surface for contacting the ground that is present within the perimeter of a contact patch along the outer, ground-engaging side of the tread divided by total area within the perimeter of the contact patch as contained within the boundary or perimeter of the contact patch.

"Volumetric Void Ratio" or "VVR" is defined as the volume of void contained within a tread divided by the total volume of the tread, the total volume of the tread including both the total volume of tread material and the total volume of void contained within a thickness of the tread extending inward from an outer side of the tread. For example, the defined portion may extend depthwise from the outer, ground-engaging side to a surface or plane arranged at the bottom of the deepest groove or void of the tread; laterally between planes extending vertically along opposing lateral side edges of the tread; and longitudinally along a length of the tread (such as a length sufficient to form a ring about a tire). As the tire tread wears and voids are eliminated, the volumetric void ratio may approach a value of zero in a completely worn state (i.e., zero void divided by the total tread volume).

Figure 1:
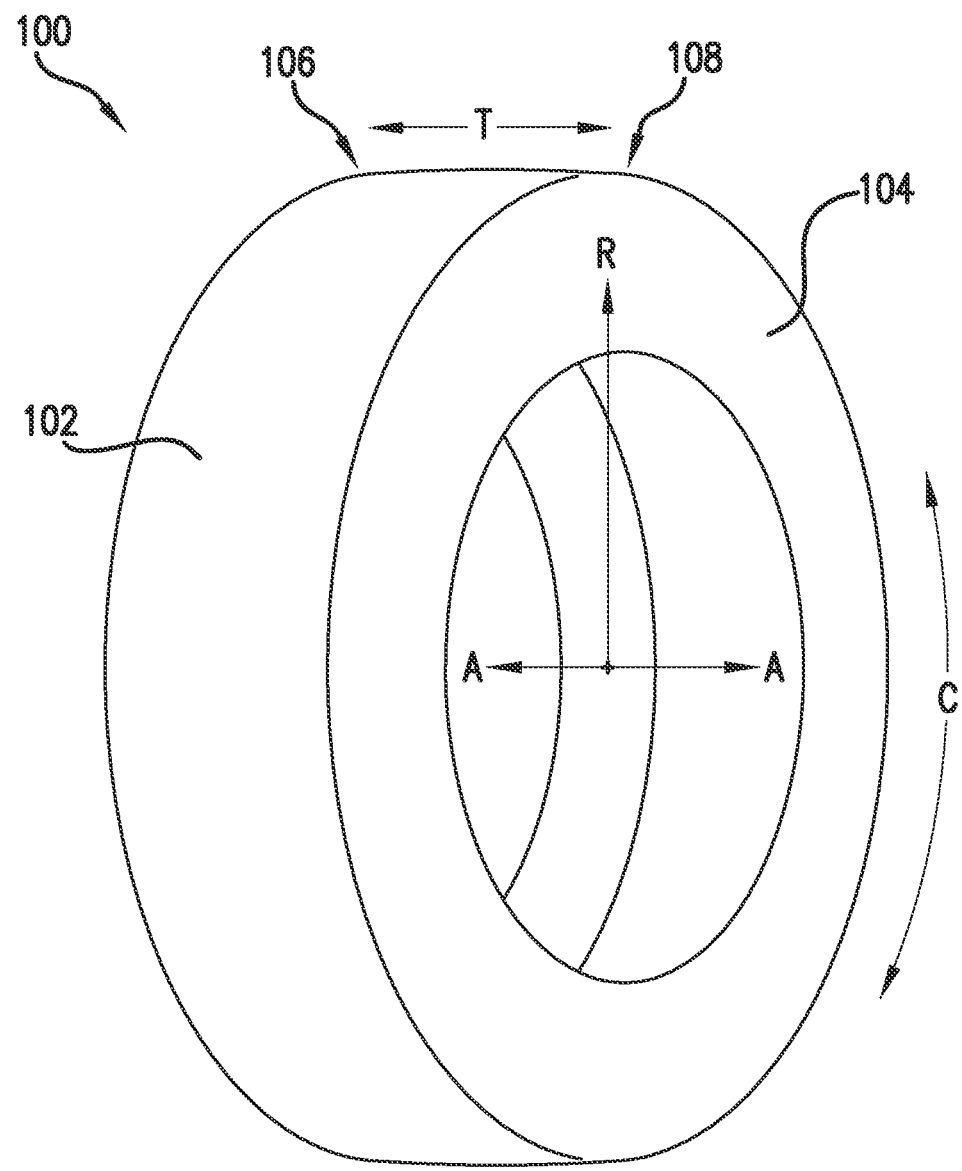
FIG. 1 provides a schematic, perspective view of an exemplary embodiment of a tire as may be provided with a tread of the present invention.

FIG. 1 provides a schematic, perspective view of an exemplary embodiment of a tire 100 as may be provided with an exemplary tread of the present invention and is also used here to provide further definitions helpful in describing the invention. Tire 100 defines a circumferential direction as indicated by arrows C that extends around the tire. Tire 100 also defines a lateral or transverse direction is indicated by arrows T that is parallel to the axis of rotation of the tire or its axial direction as denoted by arrows A. The radial direction is parallel to a line drawn perpendicular to the axis of rotation A as denoted by arrow R. A tread 102 extends circumferentially about tire 100 between shoulder regions 106 and 108. Tire 100 also includes a pair of opposing sidewalls one of which, sidewall 104, is shown in FIG. 1.

FIG. 2 provides a top view of a portion of an exemplary embodiment of a tread 102 of the present invention in a new or earlier stage of its wear life, and FIG. 3 is a perspective view of the exemplary portion shown in FIG. 2. Tread 102 has a pair of shoulder ribs 88 and 98 that are separated by interior ribs 90, 92, 94, and 96. Shoulder ribs 88 and 98 include shoulder grooves 142 and 144, respectively, which contribute to the overall void volume available for wet traction at the early stages of wear life for tire 100. It should be understood that in other embodiments of the invention, shoulder grooves 142 and 144 are not required and may not be present.

The plurality of ribs 88 through 98 are separated by a plurality of circumferential grooves 110, 112, 114, 116, and 118, each of which extends along the circumferential direction C and around tire 100. The shape and width of grooves 110 through 118 help define the shape of ribs 88 through 98 and contribute to the overall void volume available for wet traction at the early stages of wear life for tire 100. While exemplary tread portion 102 is shown in FIGS. 2 and 3 with six ribs and five circumferential grooves, tread designs of other configurations and shapes with e.g., a different number of ribs and grooves may be used to provide still other exemplary embodiments of the present invention as well.

As shown most clearly in the cross-sectional view of FIG. 4 (which also depicts tread 102 in the new or early stages of wear life), tread 102 is layered in that grooves 110 and 118 are at a depth along the radial direction that is different from the depth of grooves 112, 114, and 116. More particularly, circumferential grooves 112, 114, and 116 are each bridged or shallow in that they have a depth D2 along the radial direction that is less than the full depth D1 along the radial direction of unbridged or deep circumferential grooves 110 and 118. The reduced depth D2 enhances the rigidity of interior ribs 90, 92, 94, and 96 to improve rolling resistance and the wear life associated with tread 102. Furthermore, during early stages in the wear life of tread 102, bridged or shallow circumferential grooves 112, 114, and 116 contribute volume for the receipt of water to improve wet traction and for the consumption of matter such as snow, mud etc. for improved traction in such environments.

As tread 102 wears during use, bridged circumferential grooves 112, 114, and 116 will eventually disappear particularly during later stages of the wear life of tread 102. FIG. 5 provides a top view and FIG. 6 provides a perspective view of a portion of the same exemplary embodiment of tread 102 as shown in FIGS. 2 and 3—except that in FIGS. 5 and 6 tread 102 is in later stage of its wear life. Accordingly, bridged circumferential grooves 112, 114, and 116 are no longer present and have worn away to shallow sipes 160, 162, and 164. However, in order to provide volume for the receipt of water and wet traction performance, sipes 134, 136, 138, and 140 have worn away to reveal transverse grooves 120, 122, 124, and 126.

For this exemplary embodiment, transverse groove 120 is positioned laterally adjacent to unbridged circumferential groove 110 and is located between groove 110 and bridged circumferential groove 112. Similarly, transverse groove 126 is positioned laterally adjacent to unbridged circumferential groove 118 and is located between groove 118 and bridged circumferential groove 116. As such, for this exemplary embodiment, transverse grooves 120, 122, 124, and 126 also allow fluid to move along the lateral direction to unbridged circumferential grooves 110 and 118 from the bridged circumferential grooves when the tread is in a new or unworn condition as will be better described below. Also, these transverse grooves allow fluid or matter to move along the lateral direction to the unbridged circumferential grooves when the tread is worn. As shown, shoulder grooves 142 and 144 have given way to sipes 146 and 148 in shoulder ribs 88 and 98 as tread 102 wears. It should be understood that in other embodiments of the invention, sipes 146 and 148 are not required and may not be present.

Exemplary tread 102 also includes pockets 128, 130, and 132 that provide additional volume for the receipt of water to assist with wet traction performance. Each pocket 128, 130, and 132 is positioned at the radial bottom of a bridged circumferential groove 112, 114, and 116, each of which have given way to sipes 160, 162, and 164 as tread 102 wears. Also, each pocket 128, 130, and 132 is positioned at a transverse end of one or more of the transverse grooves 120, 122, and 124, allowing fluid communication between the bridged and unbridged circumferential grooves as just mentioned.

More particularly, referring now to FIGS. 7 and 8 and using bridged groove 112 by way of example, pocket 128 is located at a transverse end 166 of transverse groove 120 (and also at a transverse end of transverse groove 122 as shown in FIG. 5). FIGS. 7 and 8 depict tread 102 in an early stage of wear life such that transverse groove 120 is hidden or covered by a portion of tire tread 102. Sipe 134 includes an undulating portion 150 and is located above or radially outward of transverse groove 120. A similar description applies for transverse grooves 122 and 124. This sipe 134 provides traction for the tread when it is new or unworn and its undulations in both the transverse and radial directions provide better interlocking between the opposing faces of the sipe, which periodically come into contact with each other as the tire rolls into the contact patch. This helps maintain suitable rigidity of the tread and improves rolling resistance and tread wear. It should be understood that in other embodiments of the invention, sipe 134 could have a different shape, a different angle to the circumferential direction, or could be eliminated.

As shown most clearly in FIG. 8, a sipe 158 is positioned at the radially innermost portion 152 of bridged circumferential groove 112. Sipe 158 includes an undulating portion 154 extending radially inward from bridged circumferential groove 112. A cylindrically shaped portion 156 is positioned at the radially innermost part of undulating portion 154. A similar description applies for sipes positioned at the bottom of bridged circumferential grooves 114 and 116. These sipes help adherence performance on macro smooth surfaces during a later or second stage of tread life. Portion 156 helps prevent cracking at the bottom of the circumferential sipes.

FIG. 9 provides a cross-sectional view of tread 102 taken along line 9-9 of FIG. 3 in the new or early stages of the wear life. As shown in FIG. 9, transverse groove 120 has a height H that extends along radial direction R from a top depth D3 to a bottom depth D4. Also, pocket 128 has a depth D5 along the radial direction. For this exemplary embodiment, D5 has a value close to that of D1.

For this exemplary embodiment of tread 102, the depth D5 of pocket 128 is greater than the bottom depth D4 of transverse groove 120. Similarly, the depth D4 of transverse groove 120 is greater than the depth D2 of bridged circumferential groove 112. However, the relative positions of depths D2, D3, D4, and D5 may be adjusted to provide still other exemplary embodiments of the present invention. A similar description applies for transverse grooves 122 and 124.

As shown in FIG. 4 and FIG. 9, the depth D2 of the bridged circumferential grooves 112, 114, and 116 is less than the depth D1 of unbridged circumferential grooves 110 and 118. For example, in certain exemplary embodiments, depth D2 is in a range from about D1/2 to about (2*D1)/3. For the exemplary embodiment described herein, the tire had a size of 445/50R22.5 and the width of the bridged circumferential grooves 112 was about 10 mm. The width of the unbridged grooves 118 was about 12 mm. The various depths of the tread features were as follows: D1 was about 16.5 mm; D2 was about 10.5 mm; D3 was about 7.5 mm; D4 was about 15.5 mm; and D5 was about 16.5 mm. The width of the pockets 128, 130, and 132 was about 6 mm and the length was about 21.5 mm. Note that these structures, including hidden and unhidden grooves and associated sipes can be molded using a mold member network similar to what is shown and described in U.S. Patent Application Publication No. 2011168311A.

The reduction in groove depths of the bridged circumferential grooves allows an increase in tread rigidity, which can improve rolling resistance and tread wear. At the same time, the transverse distance between the circumferential grooves is substantially maintained, helping to keep wet traction and hydroplaning performances the same. Advantageously, the pockets connect the bridged grooves to the hidden transverse grooves, which in turn, are connected to the unbridged grooves either directly or indirectly by other pockets, and/or circumferential or transverse grooves. Thus, water evacuation of the tread in the new state is effectively increased without unduly compromising the rigidity of the tread. This phenomena can be explained discussing several parameters.

The first is CSR, which is the ratio of ground contacting area of the contact patch to the total area of the contact patch bounded by the theoretical boundary or perimeter of the contact patch. It is desirable to maintain a certain CSR for wet traction. This parameter measures the ability of the tread to introduce water or other matter into its network of grooves or other voids so as to allow the tire to contact the ground. If too much CSR is present, then the tire will be prone to hydroplane because the water has no place to go and water pressure will build up, lifting the tire off the ground. If too little CSR is present, than not enough ground contact can be made for suitable wet traction. Also, low CSR can lead to problems associated with wear.

As can be seen, using the bridged circumferential grooves allows CSR to be maintained when the tread is new, which is good for wet traction while also allowing for improved tread rigidity. CSR effectively measures the ability of the tread to allow water or other matter to enter its network of grooves and other voids. For this embodiment, the CSR was about 0.84 new and about 0.90 in the worn stage. A range of about 0.8 to about 0.9 CSR is considered a preferable range of CSR when employing the above described exemplary embodiment of the present invention when the tire is new and 0.8 to about 0.95 CSR when the tire is worn.

Another important parameter regarding wet traction is VVR or void volume ratio. This parameter measures the tread's ability to evacuate or communicate water or other matter away from the contact patch once the matter has entered the network of grooves or other voids of the tread. If the VVR is too high, then the tread rigidity can be compromised which leads to increased rolling resistance and tread wear. If too little VVR is present, then the water or other matter cannot be effectively removed from the contact patch quick enough, which can lead to a decreased wet traction performance and an increased probability of hydroplaning.

As can be seen, the void volume ratio has been substantially maintained by using the pockets and hidden transverse grooves without decreasing tread rigidity significantly. A range of about 0.1 to about 0.2 is considered a preferable range of VVR when employing the present invention when the tire is new and 0.05 to about 0.2 when the tire is worn. For this exemplary embodiment, computer simulations predict a four percent improvement in rolling resistance while maintaining wear performance.

The final parameter is tread rigidity, which is difficult to quantify. However, it can be dealt with qualitatively and by limiting the amount of exposed void when the tread is new. This can limit the negative impact on rolling resistance and tread wear performances.

While a certain sized tire with specific dimensions has been described, it is contemplated that other sized tires with features having different dimensions could be used and still fall within the scope of the appended claims. Also, the location of the various features such as pockets, hidden transverse grooves as well as bridged and unbridged circumferential grooves could be altered. Furthermore a ribbed tire has been described herein but it is contemplated that a tread design using tread blocks bound by transverse grooves that are exposed when the tread is new could be employed. Also, the configurations of the grooves could be changed in any manner known in the prior art for both exposed and hidden features. For example, negative draft angles could be employed and hidden transverse grooves could be found along the shoulders of the tire. It is preferable that any design alternatives have a suitable VRR, CSR and tread rigidity as the tread evolves or wears.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A tire tread having transverse, radial, and circumferential directions and a contact surface, the tire tread comprising:
   an unbridged circumferential groove extending along the circumferential direction, positioned adjacent to a shoulder region of the tire, and having a depth D1 from the contact surface along the radial direction;
   a bridged circumferential groove extending along the circumferential direction, separated from the shoulder region of the tire by the unbridged circumferential groove, and having a depth D2 from the contact surface along the radial direction;
   a sipe positioned at a radially innermost portion of said bridged circumferential groove;
   a transverse groove extending along the transverse direction, and having a height along the radial direction that extends from a top depth D3 to a bottom depth D4 and positioned so that said transverse groove is hidden during early stages of wear life of the tire tread, and
   a pocket positioned in said bridged circumferential groove at one end of said transverse groove, wherein said pocket has a depth D5 that is greater than depth D4 of said transverse groove and greater than the depth D2 of said bridged circumferential groove.

2. A tire tread as in claim 1, wherein said transverse groove is positioned between and adjacent to said unbridged circumferential groove and said bridged circumferential groove.

3. A tire tread as in claim 1, wherein said transverse groove is connected with said unbridged circumferential groove so as to provide for fluid communication therebetween.

4. A tire tread as in claim 1, further comprising:
   wherein the sipe positioned at the radially innermost portion of said bridged circumferential groove comprises
      an undulating portion extending radially inward from said bridged circumferential groove; and a cylindrically-shaped portion positioned at a radially innermost part of the undulating portion and in fluid communication with the undulating portion.

5. A tire tread as in claim 4, wherein the bottom depth D4 of said transverse groove is greater than the depth D2 of said bridged circumferential groove.

6. A tire tread as in claim 1, wherein the depth D4 of said transverse groove is greater than the depth D2 of said bridged circumferential groove.

7. A tire tread as in claim 1, wherein the top depth D3 of said transverse groove is about equal to the depth D2 of said bridged circumferential groove.

8. A tire tread as in claim 1, wherein the top depth D3 of said transverse groove is less than the depth D2 of said bridged circumferential groove.

9. A tire tread as in claim 1, wherein the depth D2 of said bridged circumferential groove is in the range from about D1/2 to about (2*D1)/3.

10. A tire comprising a tire tread as in claim 1.

11. A tire tread having transverse, radial, and circumferential directions and a contact surface, the tire tread comprising:
an unbridged circumferential groove extending along the circumferential direction, positioned adjacent to a shoulder region of the tire, and having a depth D1 from the contact surface along the radial direction;
a bridged circumferential groove extending along the circumferential direction, separated from the shoulder region of the tire by the unbridged circumferential groove, and having a depth D2 from the contact surface along the radial direction;
a transverse groove extending along the transverse direction, and having a height along the radial direction that extends from a top depth D3 to a bottom depth D4 so that said transverse groove is covered by a portion of the tire tread during earlier stages of tread wear life, said transverse groove having at least one end; and
a pocket positioned in said bridged circumferential groove at the end of said transverse groove and connected with said transverse groove, said pocket having a depth D5 that is greater than depth D4 of said transverse groove and greater than the depth D2 of said bridged circumferential groove.

12. A tire tread as in claim 11, wherein said unbridged circumferential grooves comprising a pair of unbridged circumferential grooves, wherein said bridged circumferential grooves comprises a plurality of bridged circumferential grooves, and wherein all of said bridged circumferential grooves are located between the unbridged circumferential grooves along the axial direction.

13. A tire tread as in claim 11, further comprising:
a sipe positioned at a radially innermost portion of said bridged circumferential groove, said sipe including
an undulating portion extending radially inward from said bridged circumferential groove; and
a cylindrically-shaped portion positioned at a radially innermost end of the undulating portion.

14. A tire tread as in claim 11, wherein the depth D2 of said bridged circumferential groove is in the range from about D1/2 to about (2*D1)/3.

15. A tire tread as in claim 14, wherein the bottom depth D4 of said transverse groove is greater than the depth D2 of said bridged circumferential groove.

16. A tire tread as in claim 14, wherein the top depth D3 of said transverse groove is about equal to the depth D2 of said bridged circumferential groove.

17. A tire having transverse, radial, and circumferential directions, the tire having a pair of shoulder regions, the tire comprising:
a plurality of unbridged circumferential grooves extending along the circumferential direction and having a depth D1 along the radial direction;
a plurality of bridged circumferential grooves extending along the circumferential direction and having a depth D2 along the radial direction, said plurality of bridged circumferential grooves separated from the shoulder regions along the axial direction by the unbridged circumferential grooves;
a plurality of transverse grooves extending along the transverse direction with at least one of said transverse grooves positioned between one of said bridged circumferential grooves and one of said unbridged circumferential grooves, each said transverse groove having a height along the radial direction that extends from a top depth D3 to a bottom depth D4 so that said transverse groove is covered by a portion of the tire tread during earlier stages of tread wear life; and
a plurality of pockets, each pocket positioned in one of said bridged circumferential grooves at an end of one of said transverse grooves, each said pocket having a depth D5 that is greater than depth D4 of said transverse grooves and greater than the depth D2 of said bridged circumferential groove.

18. A tire as in claim 17,
wherein at least one of said pockets is located at the ends of at least two transverse grooves and is connected with each of said at least two transverse grooves.

19. A tire tread having transverse, radial, and circumferential directions and a contact surface, the tire tread comprising:
a bridged circumferential groove extending along the circumferential direction and having a depth D2 from the contact surface along the radial direction;
a sipe positioned at a radially innermost portion of said bridged circumferential groove;
a transverse groove extending along the transverse direction, and having a height along the radial direction that extends from a top depth D3 to a bottom depth D4 so that said transverse groove is covered by a portion of the tire tread during earlier stages of tread wear life, said transverse groove having at least one end having a width along the circumferential direction, said transverse groove having a bottom depth D4 that is more than depth D2 and being in fluid communication with said bridged groove;
an unbridged circumferential groove positioned along a shoulder region of the tire, extending along the circumferential direction, and having a depth D1 from the contact surface along the radial direction; and
a pocket positioned in said bridged circumferential groove at the end of said transverse groove, said pocket having a length along the circumferential direction that is greater than the width along the circumferential direction of said transverse groove, said pocket having a depth D5 that is greater than depth D4 of said transverse groove and greater than the depth D2 of said bridged circumferential groove.

* * * * *